United States Patent [19]
Itoi et al.

[11] Patent Number: 5,516,075
[45] Date of Patent: May 14, 1996

[54] CONTROLLER

[75] Inventors: Shigeru Itoi; Tetsuya Kojima, both of Osaka, Japan

[73] Assignee: Fujikin Incorporated, Osaka, Japan

[21] Appl. No.: 434,404

[22] Filed: May 3, 1995

[30] Foreign Application Priority Data

Mar. 13, 1995 [JP] Japan .................................. 7-052756

[51] Int. Cl.⁶ .................................................. F16K 31/163
[52] U.S. Cl. ......................... 251/58; 74/54; 74/110; 74/516; 74/519; 74/569; 92/130 A; 92/140; 251/63.5; 251/263; 251/331
[58] Field of Search ................................. 74/54, 110, 516, 74/519, 569; 92/130 A, 130 B, 138, 140; 251/58, 63.5, 63.6, 251, 263, 331

[56] References Cited

U.S. PATENT DOCUMENTS

| | | | |
|---|---|---|---|
| 2,395,223 | 2/1946 | Ingress | 74/516 |
| 4,270,398 | 6/1981 | Arnold | 74/110 |
| 4,549,719 | 10/1985 | Baumann | 251/280 |
| 4,609,178 | 9/1986 | Baumann | 251/251 |
| 4,684,103 | 8/1987 | Baumann | 251/58 |
| 4,729,544 | 3/1988 | Baumann | 251/331 |
| 4,791,856 | 12/1988 | Heim et al. | 251/63.6 |
| 4,871,143 | 10/1989 | Baker | 74/54 |
| 4,875,404 | 10/1989 | Aldridge | 92/130 A |
| 4,925,154 | 5/1990 | Baker | 251/63.6 |
| 5,215,286 | 6/1993 | Kolenc | 251/58 |

*Primary Examiner*—George L. Walton
*Attorney, Agent, or Firm*—Armstrong, Westerman, Hattori, McLeland & Naughton

[57] ABSTRACT

A controller comprises a valve body having a valve element and a valve seat defining a fluid cannel openable and closable with a reciprocating upward and downward movement of a valve stem, a casing fixed to an upper portion of the valve body, an operating rod provided in an upper inside portion of the casing upwardly and downwardly movably, a drive device for moving the rod upward and downward, and a transmission device provided in a lower inside portion of the casing for transmitting a force acting on the rod to the valve stem. The transmission device comprises a first roller contact member in the form of a downwardly flaring frustoconical recessed portion open downward and formed on an underside of a large-diameter portion of the rod concentrically therewith, a second roller contact member provided at an upper end of the valve stem, a pair of roller support members arranged between the two contact members symmetrically with respect to the axis of the operating rod, a pair of rollable rollers each rotatably supported by the support member at an upper portion thereof and bearing on a tapered face of the first roller contact member, and a pair of push rollers each rotatably supported by the support member at a lower portion thereof and bearing on an upwardly facing roller support surface of the second roller contact member. Each of the support members is supported by the casing so as to be pivotally movable about an axis outwardly spaced from the axis of the rod by a greater distance than the axis of the corresponding push roller.

2 Claims, 4 Drawing Sheets

CONTROLLER

BACKGROUND OF THE INVENTION

The present invention relates to controllers for opening and closing a fluid channel.

Controllers are already known which include those adapted to close a fluid channel by a valve stem biased downward by a spring and to open the fluid channel by driving the valve stem upward with a force of pneumatic pressure, solenoid, or the like, which is greater than the force of the spring, and those adapted to open a fluid channel by a valve stem biased upward with a spring and to close the fluid channel by urging the valve stem downward with a force of pneumatic pressure, solenoid, or the like, which is greater than the force of the spring.

In the case where such conventional controllers are used for high-pressure fluids, there arises a need to use an increased force for closing the fluid channel to prevent leakage of the fluid. However, the controller wherein the valve stem is biased downward by a spring to close the fluid channel and driven upward by pneumatic pressure, solenoid, or the like, to open the fluid channel has the problem that the channel closing force cannot be increased as required, because an increase in the force of the spring necessitates an increase in the pneumatic, or like, force for driving the valve stem but the increase in the driving force is limited. The controller wherein the valve stem is biased upward by a spring to open the fluid channel and urged downward with a force of pneumatic pressure, solenoid, or the like, which is greater than the spring force to close the fluid channel has a similar problem since an increase in the channel closing force requires an increase in the pneumatic, or the like downward urging force.

SUMMARY OF THE INVENTION

An object of the present invention is to provide a controller wherein the fluid channel closing force can be increased, as required, without increasing pneumatic pressure, elastic force of spring or drive force of solenoid, or the like, and which is therefore usable for high-pressure fluids with leakage of the fluid prevented reliably.

The terms "upward" and "downward" are herein used with reference to the state of the present device in use as shown in FIG. 1.

The controller embodying the present invention comprises a valve body having a valve element and a valve seat defining therebetween a fluid channel openable and closable with a reciprocating upward and downward movement of a valve stem, a casing fixed to an upper portion of the valve body, an operating rod provided in an upper inside portion of the casing upwardly and downwardly movably and having a small-diameter portion and a large-diameter portion integral with a lower end thereof, drive means for moving the operating rod upward and downward, and power transmission means provided in a lower inside portion of the casing for transmitting a force acting on the operating rod to the valve stem, the power transmission means comprising a first roller contact member having a downwardly flaring frustoconical recessed portion open downward and formed on an underside of the large-diameter portion of the operating rod concentrically with the rod, a second roller contact member provided at an upper end of the valve stem, a pair of roller support members arranged between the two roller contact members symmetrically with respect to the axis of the operating rod, a pair of rollable rollers each rotatably supported by the roller support member at an upper portion thereof and bearing on a tapered face of the frustoconical recessed portion, and a pair of push rollers each rotatably supported by the roller support member at a lower portion thereof and bearing on an upwardly facing roller support surface of the second roller contact member, each of the roller support members being supported by the casing so as to be pivotally movable about an axis outwardly spaced from the axis of the operating rod by a greater distance than the axis of the corresponding push roller.

With reference to FIG. 4 showing the above arrangement, suppose a force F acts on the operating rod 21, and the tapered face 26a of the frustoconical recessed portion 26 of the first roller contact member 24 makes an angle $\alpha$ with a vertical plane. A force then acts on the rollable rollers 46 in a direction perpendicular to the tapered face 26a. This force G acting on one roller 46 is given by the equation; $G=F\div 2\sin\alpha$.

The force G acting on the rollable roller 46 is transmitted to the second roller contact member 19 via the roller support member 43 and push roller 45.

Suppose the distance between the central axis 74 of pivotal movement of the roller support member 43 and the axis 75 of the rollable roller 46 is C, the angle a line through the central axis 74 of pivotal movement of the support member 43 and through the axis 75 of the rollable roller 46 makes with the tapered face 26a of the recessed portion 26 is $\gamma$, the horizontal distance from the central axis 74 to the axis 76 of the corresponding push roller 45 is $\delta$, and the downward pushing force exerted by the push roller 45 on the second roller contact member 19 is N. The arrangement then has the relationship of $N\times\delta = G\times\cos\gamma\times C$. Accordingly, the downward force with which the two push rollers 45 push the roller contact member 19, i.e., the downward pushing force on the valve stem 2, is given by $2N=F\times\cos\gamma\times C\div\sin\alpha\div\delta$. Thus, the force acting on the operating rod 21 can be transmitted as amplified at a desired ratio to the valve stem 2 by adjusting $\alpha$, $\gamma$, $\delta$ and C to suitable values. This makes it possible to increase the fluid channel closing force as required without increasing the air pressure, spring force or force of a solenoid, or the like, for opening the fluid channel, whereby leakage of the fluid can be prevented reliably even when the fluid has a high pressure.

In the case where a working fluid, such as compressed air, is used as the drive means, it is desired that the inside of the casing be divided into two upper and lower chambers by the first roller contact member with a spring disposed in the upper chamber for biasing the operating rod downward, such that the working fluid is admitted into the lower chamber to urge the operating rod upward.

DESCRIPTION OF THE PREFERRED EMBODIMENT

Figure 1:
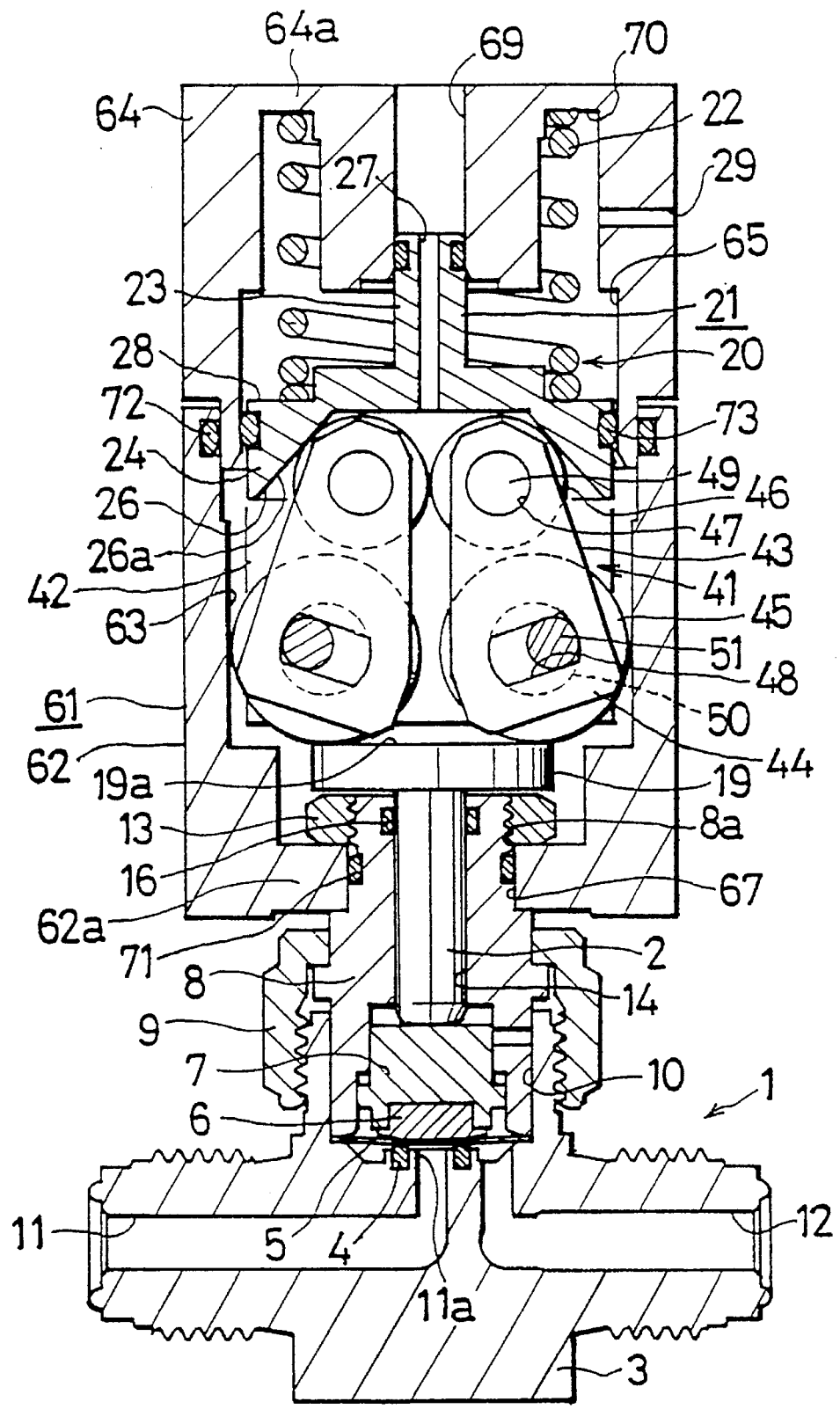
FIG. 1 is a view in vertical section showing a controller of the invention in a closed state.
Figure 2:
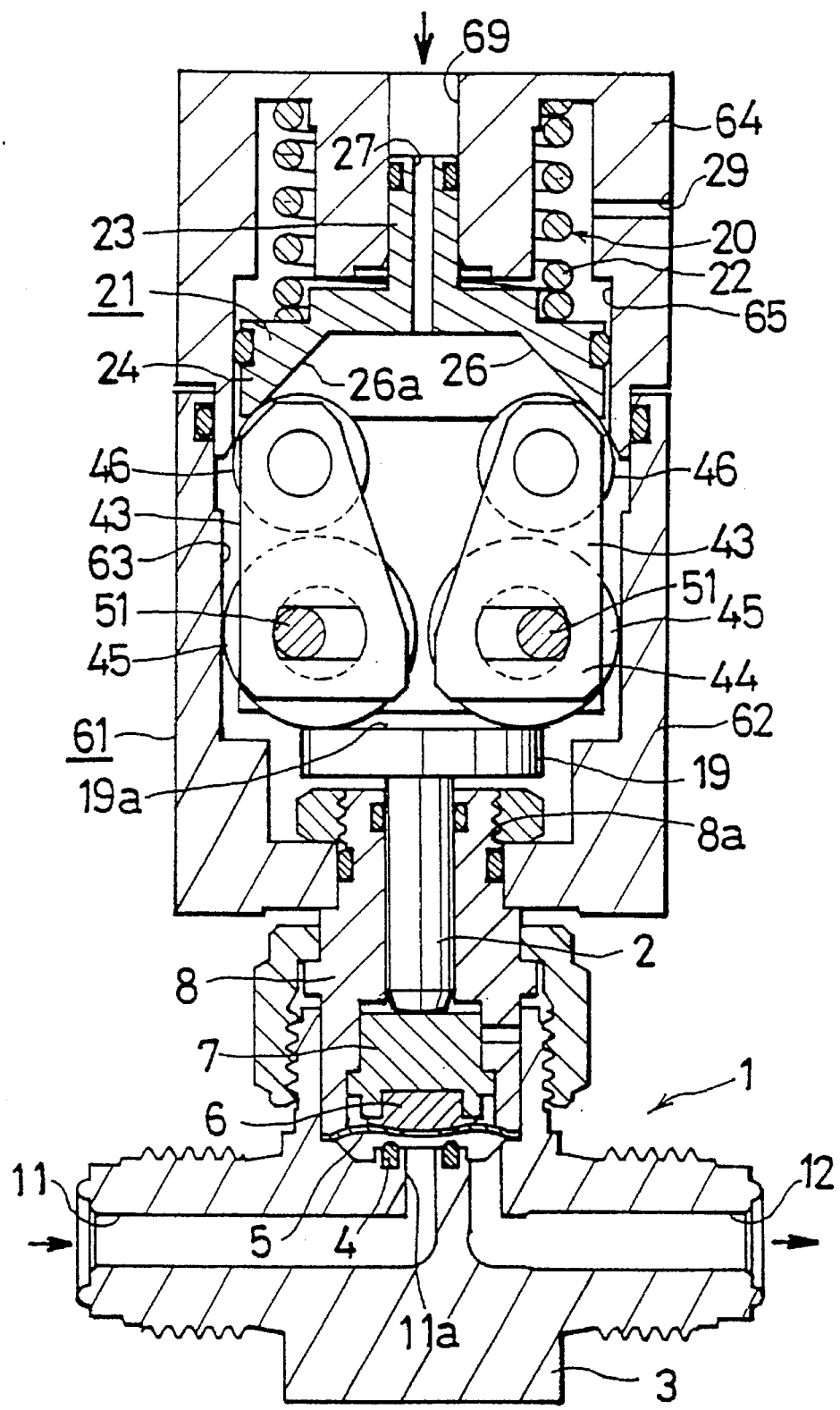
FIG. 2 is a view in vertical section showing the same in an open state.

An embodiment of the invention will be described below with reference to the drawings. In the following description, the term "front" refers to the left-hand side of FIG. 1, the term "rear" to the right-hand side of the drawing, and the terms "right" and "left" are used for the embodiment as viewed from the rear toward the front.

With reference to FIGS. 1 to 4, the illustrated controller comprises a valve body 1, a casing 61 fixed to the upper portion of the valve body 1, an operating rod 21 provided in the upper inside portion of the casing 61 and movable upward and downward, a drive device 20 for moving the rod 21 upward and downward, and a power transmission device 41 provided in the lower inside portion of the casing 61 for transmitting a force acting on the operating rod 21 to a valve stem 2.

The valve body 1 comprises a valve case 3 which is formed with a cavity 10 opened upward, a fluid inlet channel 11 having a forwardly open end and another open end in communication with the central portion of bottom of the cavity 10, and a fluid outlet channel 12 having a rearwardly open end and another open end in communication with the rear portion of bottom of the cavity 10. The valve body 1 further comprises an annular valve seat 4 provided on the peripheral edge of the open rear end 11a of the inlet channel 11, a diaphragm (valve element) 5, a diaphragm holder 6, a disk 7 having the diaphragm holder 6 attached to .its lower end, the valve stem 2 for moving the disk 7 upward and downward, and a bonnet 8 having a stem guide bore 14 and fastened to the valve case 3 with a nut 9. The valve element 5 and the valve seat 4 define therebetween a fluid channel 11a, which is opened and closed with reciprocating upward and downward movement of the valve stem 2. An O-ring 16 is interposed between the outer periphery of the valve stem 2 and the bonnet wall defining the stem guide bore 14.

The casing 61 comprises a lower casing member 62 which is open upward, and an upper casing member 64 which is open downward. The upper casing member 64 is internally formed with a cylinder chamber 65 of circular horizontal section. The lower casing member 62 has a power transmission chamber 63 of square or rectangular horizontal section inside thereof. The upper casing member 64 has a top wall 64a which is centrally formed with a through bore 69 for admitting compressed air and also for guiding the operating rod 21. The lower casing member 62 has a bottom wall 62a which is centrally formed with a bonnet hole 67. The upper end of the bonnet 8 is inserted through the hole 67. The bonnet upper end has an externally threaded portion 8a, on which a lock nut 13 is screwed to fix the valve body 1 to the lower casing member 62. O-rings 71, 72 are interposed respectively between the lower casing member 62 and the bonnet 8 and between the casing member 62 and the upper casing member 64.

The operating rod 21 comprises a small-diameter portion 23 having an upper end inserted in the through bore 69 of the upper casing member 64, and a large-diameter portion (first roller contact member) 24 integral with the lower end of the portion 23 and inserted in the cylinder chamber 65. An O-ring 73 is interposed between the outer periphery of the large-diameter portion 24 and the inner periphery of the upper casing member 64.

Annular spring retaining recesses 28, 70 are formed respectively in the upper surface of large-diameter portion of the operating rod 21 and in the lower surface of top wall 64a of the upper casing member 64. A spring 22 for biasing the operating rod 21 downward is fitted in and held by these retaining recesses 28, 70. The operating rod 21 has a compressed air inlet passage 27 communicating at its one end with the through bore 69 of the upper casing member 64 and at the other end thereof with the power transmission chamber 63. The peripheral wall of the upper casing member 64 is formed with an air outlet passage 29 for releasing air from inside the cylinder chamber 65 therethrough when the rod 21 moves upward.

The power transmission device 41 comprises a downwardly flaring frustoconical recessed portion 26 which is open downward and formed on an underside of the large-diameter portion (first roller contact member) 24 of the operating rod 21 concentrically with the rod 21, a second roller contact member 19 provided at the upper end of the valve stem 2, a pair of roller support members 43 arranged between the recessed portion 26 and the second roller contact member 19 symmetrically with respect to the axis 77 of the operating rod 21, a pair of rollable rollers 46 each rotatably supported by the upper portion of the roller support member 43, and a pair of push rollers 45 each rotatably supported by the lower portion of the support member 43.

The second roller contact member 19, which is in the form of a disk, is disposed above the bonnet 8 inside the casing 61.

The front and rear roller support members 43 each comprise a pair of right and left vertical plates 44 for holding the rollable roller 46 and the push roller 45 therebetween. Each of the vertical plates 44 has a circular rollable roller shaft hole 47 at its upper end portion and a push roller shaft hole 48 at its lower end portion.

Figure 3:
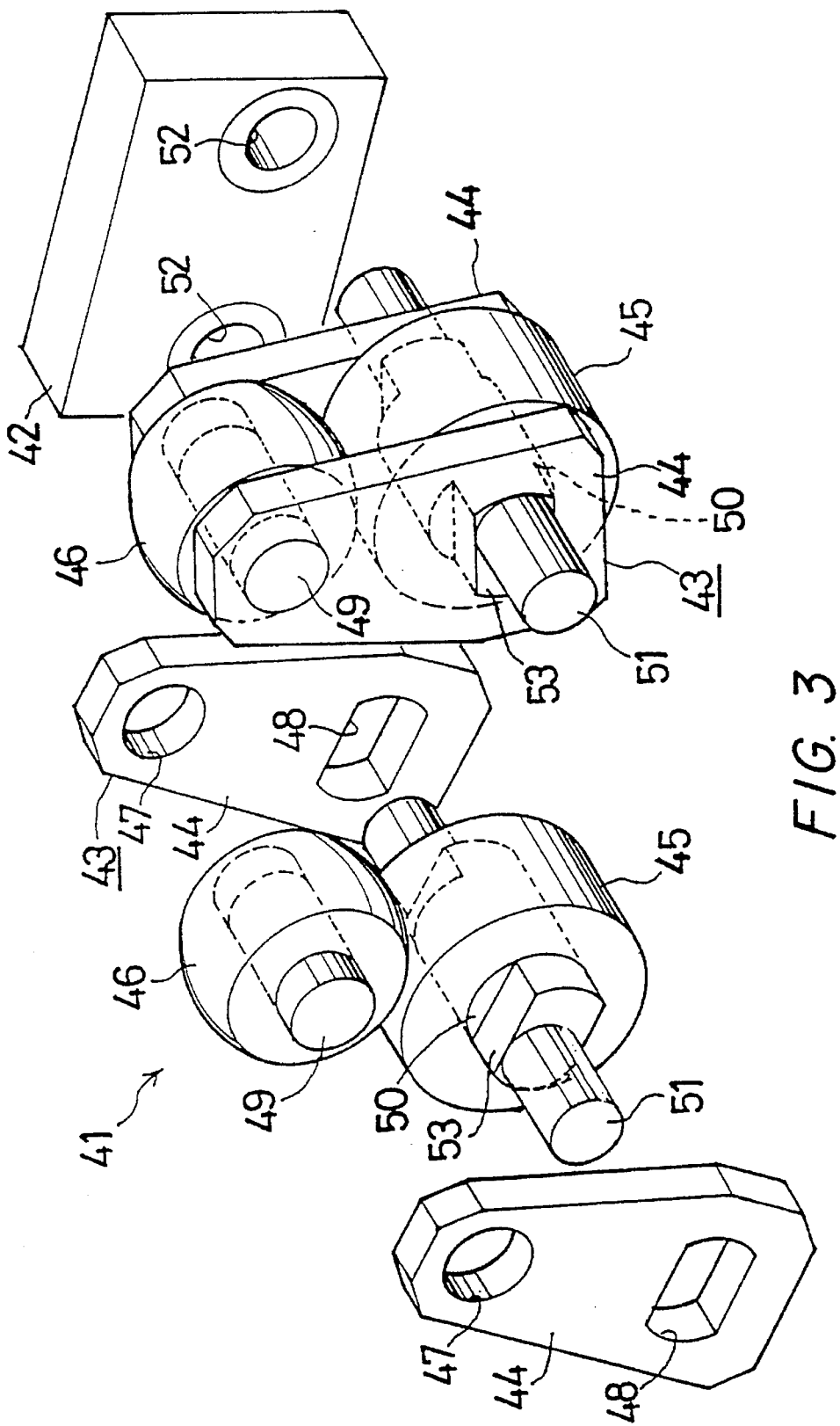
FIG. 3 is an exploded perspective view showing a power transmission device of the controller of the invention.
Figure 4:
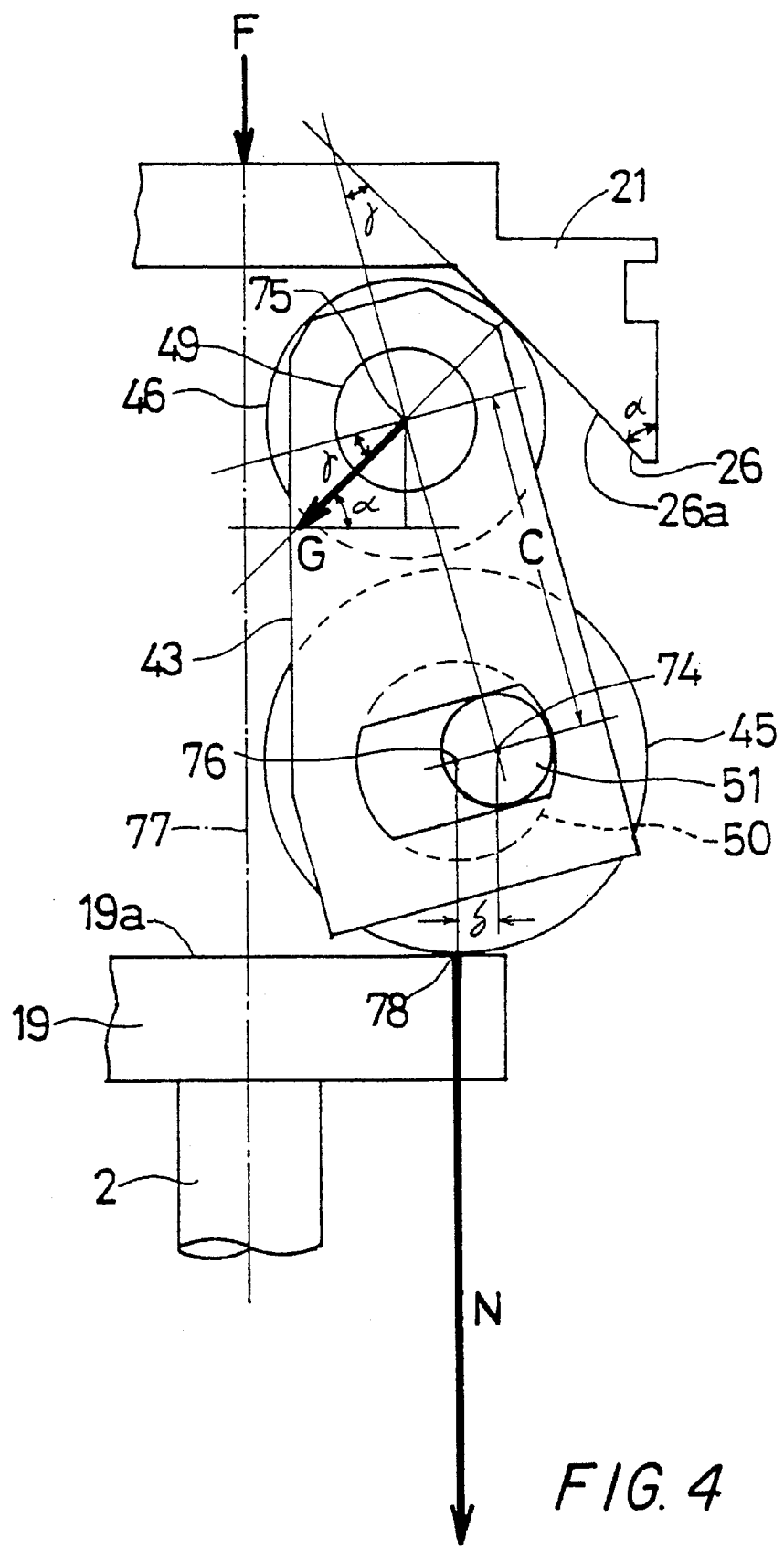
FIG. 4 is an enlarged fragmentary diagram illustrating the principle on which the force acting on an operating rod is transmitted as amplified by the transmission device to a valve stem.

Each of the front and rear rollable rollers 46 is rotatably fitted around a horizontal shaft 49 extending transversely of the controller and having each of its right and left ends fixedly fitted in the shaft hole 47. Thus, the rollable roller 46 is supported by the corresponding support member 43 rotatably about the horizontal shaft. As shown in FIG. 3, each rollable roller 46 bulges at the middle portion of its outer peripheral surface, and this middle bulging portion is in bearing contact with the tapered face 26a of the recessed portion 26.

Each of the front and rear push rollers 45 is rotatably fitted around a horizontal shaft 50 extending transversely of the controller. Each of the right and left ends of the roller shaft 50 is cut away at its upper and lower sides to provide a fitting portion 53. The fitting portion 53 is fitted in the push roller shaft hole 48 which is shaped in conformity with the portion 53, whereby the push roller 45 is supported by the corresponding support member 43 rotatably about the transverse horizontal shaft. The push rollers 45 bear on an upwardly facing roller support surface 19a of the second roller contact member 19.

The shaft 50 of each push roller 45 further has integrally with each of its opposite ends an eccentric pivot 51 about which the roller support member 43 is pivotally movable. The axis 74 of the eccentric pivot 51, i.e., the central axis of pivotal movement, is slightly spaced from the axis 76 of the push roller 45 toward a direction away from the axis 77 of the operating rod 21 (see FIG. 4).

Right and left retainers 42 each in the form of a vertical rectangular plate are arranged so as to hold the front and rear support members 43 therebetween, and are secured to the respective right and left side walls of the lower casing member 62 inside thereof.

The outer end of each eccentric pivot 51 is rotatably fitted in a bearing 52 provided on the corresponding retainer 42, whereby the eccentric pivot 51 is rotatably supported by the lower casing member 62 so as to be immovable forward or rearward, upward or downward, and rightward or leftward, rendering the support member 43 pivotally movable about the axis 74 of the eccentric pivot 51.

When the roller support member 43 is pivotally moved, the axis 76 of the push roller 45 revolves about the axis 74 of the eccentric pivot 51, thereby altering the distance from the axis 76 of the push roller 45 to the point 78 of contact between the push roller 45 and the second roller contact member 19 to vary the pushing force exerted by the push roller 45 on the second roller contact member 19.

The drive device 20 for moving the operating rod 21 upward and downward comprises a spring 22 for biasing the rod 21 downward at all times, and means for admitting compressed air for urging the operating rod 21 upward. The compressed air is introduced into the transmission chamber 63 through the inlet passage 27 to drive the rod 21 upward.

When the fluid channel is in the closed state shown in FIG. 1, the operating rod 21 is held in a lowered position by being biased downward by the force of the spring 22, with the front and rear rollable rollers 46 positioned close to each other 0 and with the front and rear push rollers 45 positioned away from each other. The elastic force of the spring 22 is delivered through the rollable rollers 46, support members 43 and push rollers 45 to the second roller contact member 19, pushing the valve stem 2 5 downward. This force is transmitted to the diaphragm 5 to hold the open rear end 11a of the fluid inlet channel 11 closed.

The force exerted on the second roller contact member 19 can be made greater than the elastic force of the spring 22 by adjusting the taper angle of the tapered face 26a of the recessed portion 26, the distance between the axis 74 of the eccentric pivot 51 and the axis 75 of the rollable roller shaft 49 and the horizontal distance between the axis 76 of the push roller shaft 50 and the axis 74 of the eccentric pivot 51 to suitable values. This principle will be described with reference to FIG. 4.

Suppose the elastic force of the spring 22 acting on the operating rod 21 is F, and the angle the tapered face 26a of the recessed portion 26 makes with a vertical plane is $\alpha$. A force then acts on the rollable rollers 46 in a direction perpendicular to the tapered face 26a. This force G acting on the respective front and rear rollable rollers 46 is given by the equation; $G = F \div 2 \sin \alpha$.

The force G acting on the rollable roller 46 is transmitted to the second roller contact member 19 via the roller support member 43 and push roller 45.

Suppose the distance between the axis 74 of the eccentric pivot 51 and the axis 75 of the rollable roller shaft 49 is C, a line through the axis 75 of the rollable roller shaft 49 and through the axis 74 of the eccentric pivot 51 makes an angle $\gamma$ with the tapered face 26a of the recessed portion 26, the horizontal distance from the axis 76 of the push roller shaft 50 to the axis 74 of the eccentric pivot 51 is $\delta$, and the downward pushing force exerted by one of the front and rear push rollers 45 on the second roller contact member 19 is N. The arrangement then has the relationship of $N \times \delta = G \times \cos \gamma \times C$. Accordingly, the downward force with which the two front and rear push rollers 45 push the second roller contact member 19, i.e., the downward pushing force on the valve stem 2 is given by the equation; $2N = F \times \cos \gamma \times C \div \sin \alpha \div \delta$. Thus, the force acting on the operating rod 21 can be transmitted, as amplified at a desired ratio, to the valve stem 2 by determining suitable values for $\alpha$, $\gamma$, $\delta$ and C.

With the present embodiment, $\alpha = 40°$, $\gamma 25°$, C=12.5, $\delta = 1.5$, and the amplification ratio is about 12 times.

When the operating rod 21 is driven upward with the compressed air admitted in the state shown in FIG. 1, the front and rear rollable rollers 46 are moved away from each other, the front and rear support members 43 are pivotally moved, and the front and rear push rollers 45 are moved toward each other. This decreases the distance from the axis of the push roller 45 to the point 78 of contact between the push roller 45 and the roller contact member 19, nullifying the force of each push roller 45 to push the valve stem 2 downward, whereupon the diaphragm 5 is pushed up by the fluid pressure to open the valve (see FIG. 2).

The air pressure required to open the valve is sufficient if it is slightly greater than the elastic force of the spring 22. Since the force of the spring 22 can be diminished based on the principle of amplification shown in FIG. 4, the air pressure required for opening the valve can be small.

Although the operating rod 21 is driven by air pressure for opening the valve according to the foregoing embodiment, the rod can be driven, for example, by a solenoid instead of the air pressure.

Further in addition to the spring 22 for biasing the operating rod 21 downward, a solenoid or working fluid, such as compressed air, may be used for biasing the operating rod 21 upward to hold the rod in its upper position, such that the rod 21 is moved down by removing the force of the solenoid or compressed air or like working fluid.

Although not shown, a partition plate may be disposed between the cylinder chamber 65 and the transmission chamber 63 to prevent the compressed air from flowing into the transmission chamber 63, with the small-diameter portion of the operating rod extending through the partition plate, such that the first roller contact member having the downwardly flaring frustoconical recessed portion is provided on the small-diameter portion at the part thereof below the partition plate, with a large-diameter portion provided on the small-diameter portion at the part thereof above the partition plate, to introduce compressed air into a space between the large-diameter portion and the partition plate for urging the operating rod upward. If the large-diameter portion of the operating rod is made to serve also as the first roller contact member for the compressed air to flow into the transmission chamber 63 as in the illustrated embodiment, the partition plate can be dispensed with, whereby the vertical length of the controller can be reduced.

What is claimed is:

1. A controller comprising a valve body having a valve element and a valve seat defining therebetween a fluid channel openable and closable with a reciprocating upward and downward movement of a valve stem, a casing fixed to an upper portion of the valve body, an operating rod provided in an upper inside portion of the casing and being upwardly and downwardly movable and having a small-diameter portion and a large-diameter portion integral with a lower end thereof and being mutually spacedly disposed along the longitudinal axis of said operating rod, drive means for moving the operating rod upward and downward, and power transmission means provided in a lower inside portion of the casing for transmitting a force acting on the operating rod to the valve stem, the power transmission means comprising a first roller contact member having a downwardly flaring frustoconical recessed portion opening downward and provided on an underside of the large-diameter portion of the operating rod concentrically with the rod, a second roller contact member provided at the upper end of the valve stem, a pair of opposed roller support members arranged between the two roller contact members symmetrically with respect to the axis of the operating rod, a pair of rollable rollers each being rotatably supported by each of the roller support members at an upper portion thereof and bearing on a tapered face of the frustoconical recessed portion, and a pair of push rollers each being rotatably supported by each of the roller support members at a lower portion thereof and bearing on an upwardly facing roller support surface of the second roller contact member, each of the roller support members being pivotably supported with respect to the casing so as to be pivotally movable about an axis perpendicular to and laterally spaced from the axis of the operating rod a distance greater than the spacing from said operating rod axis to the rotational axis of the corresponding push roller and effective to vertically move said stem by lateral movement of said push rollers in response to an opposite lateral movement of said rollable rollers induced by engagement with said tapered face of said recessed portion, during upward and downward movement of said operating rod by said drive means.

2. A controller as defined in claim 1 wherein when a working fluid is used as the drive means, the inside of the casing is divided into two upper and lower chambers by the first roller contact member with a spring disposed in the upper chamber for biasing the operating rod downward, and the working fluid is admitted into the lower chamber to urge the operating rod upward against the spring bias.

* * * * *